(12) United States Patent
Auernhammer et al.

(10) Patent No.: US 8,635,619 B2
(45) Date of Patent: Jan. 21, 2014

(54) SCHEDULE VIRTUAL INTERFACE ALLOWING RESYNCHRONIZATION REQUESTS FOR LOCK TOKENS BEFORE ATTACHMENT OF A SCHEDULING ELEMENT TRIGGERED BY AN UNLOCK REQUEST

(75) Inventors: Florian A. Auernhammer, Adliswil (CH); Patricia M. Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/874,476

(22) Filed: Sep. 2, 2010

(65) Prior Publication Data

US 2011/0131581 A1 Jun. 2, 2011

(30) Foreign Application Priority Data

Nov. 30, 2009 (EP) .................................. 09177540

(51) Int. Cl.
*G06F 9/46* (2006.01)
*G06F 12/00* (2006.01)
*G06F 11/30* (2006.01)

(52) U.S. Cl.
USPC ............ 718/102; 710/200; 713/193; 718/100

(58) Field of Classification Search
None
See application file for complete search history.

(56) References Cited

U.S. PATENT DOCUMENTS

| 5,423,044 | A * | 6/1995 | Sutton et al. | 710/200 |
|---|---|---|---|---|
| 7,152,122 | B2 * | 12/2006 | Kagan et al. | 709/250 |
| 7,593,948 | B2 | 9/2009 | Suggs et al. | |
| 2003/0115476 | A1 * | 6/2003 | McKee | 713/193 |
| 2008/0123672 | A1 | 5/2008 | Wilkinson | |

OTHER PUBLICATIONS

Auernhammer et al; Design optimization of a highly parallel InfiniBand Host Channel Adapter; ANCS'08, Nov. 6-7, 2008.*
Dunning et al; The Virtual Interface Architecture; IEEE Micro, 1998.*
U.S. Appl. No. 13/558,503.

* cited by examiner

*Primary Examiner* — Jennifer To
*Assistant Examiner* — Bing Zhao
(74) *Attorney, Agent, or Firm* — Stephen R. Tkacs; Stephen J. Walder, Jr.; Jennifer R. Davis (57) ABSTRACT

A mechanism is provided for scheduling virtual interfaces having at least one virtual interface scheduler, a virtual interface context cache and a pipeline with a number of processing units. The virtual interface scheduler is configured to send a lock request for a respective virtual interface to the virtual interface context cache. The virtual interface context cache is configured to lock a virtual interface context of the respective virtual interface and to send a lock token to the virtual interface scheduler in dependence on said lock request. The virtual interface context cache configured to hold a current lock token for the respective virtual interface context and to unlock the virtual interface context, if a lock token of an unlock request received from the pipeline matches the held current lock token.

17 Claims, 7 Drawing Sheets

SCHEDULE VIRTUAL INTERFACE ALLOWING RESYNCHRONIZATION REQUESTS FOR LOCK TOKENS BEFORE ATTACHMENT OF A SCHEDULING ELEMENT TRIGGERED BY AN UNLOCK REQUEST

BACKGROUND

The invention relates to a mechanism for scheduling virtual interfaces.

Today's computer systems are heavily virtualized to make use of the growing number of cores per processor, e.g. consolidating many servers into one. While processor virtualization is available in all general purpose processors today, one of the major remaining challenges is the virtualization of I/O devices such that all virtual machines, or even all consumers, have their private interface to I/O devices, bypassing the hypervisor for better performance. The third generation of PCI Express therefore introduces I/O virtualization extensions (SRIOV, MRIOV).

However, hardware virtualization is limited by resources in the I/O controller. In this regard, e.g. InfiniBand provides virtual interfacing without dedicated hardware support in the I/O controller and is thus able to provide more virtual interfaces.

The virtual interfaces (VIs) are conventionally implemented using memory queues. Consumers put work requests on the queues and ring their device doorbell to notify the device of new work. Each virtual interface further requires its own context in the device.

There are two major challenges for designing a virtualized I/O device, no matter if hardware or software virtualization is used:

First, the device needs to support a large number of virtual interfaces, which usually exceeds the storage space that can be implemented in a device. Therefore, devices may use small on-chip caches for a limited number of virtual interface contexts, and store the remainder in large backing store memory.

The second challenge is implementing the device processing such that it is able to support all load scenarios up to the case where all VIs have outstanding work while also scaling performance.

For the processing part, there are two device architecture alternatives: monolithic queue processors or pipelined processing.

A common prerequisite for both is that during processing, virtual interface context data needs to stay in the device cache to avoid inconsistencies and stalls.

Many device implementations use monolithic processing units for processing, because it is easier to design, debug and make late changes. Especially network processing is very data dependant, requiring several data fetches during processing, at least two for work request and payload data. Data misses that need to be resolved by system memory requests stall processing in a monolithic design, such that queue processors are most of the time just waiting for data. Thus, the major problem of this approach is efficient scaling as monolithic queue processors are inefficient in resource usage compared with a pipeline and contend for shared resources. On the other hand, it is quite easy to keep track of the virtual interfaces processed. The device only needs to check the virtual interfaces in the different processors.

A pipelined design is much more efficient in terms of resource usage and performance scaling. However, it is more difficult to keep track of the virtual interfaces that are currently in flight in the pipeline, either in a processing unit or in a queue. Checking all pipeline stages is very tedious and slow, limiting scalability. However, non-extensive checking potentially allows virtual interface castouts while there is work remaining for the virtual interface (VI) due to race conditions.

SUMMARY

According to a first aspect of the invention, a device is provided for scheduling virtual interfaces having at least one virtual interface scheduler, a virtual interface context cache and a pipeline with a number of processing units, said virtual interface scheduler configured to send a lock request for a respective virtual interface to the virtual interface context cache, said virtual interface context cache configured to lock a virtual interface context of said respective virtual interface and to send a lock token to said virtual interface scheduler in dependence on said lock request, said virtual interface context cache configured to hold a current lock token for the respective virtual interface context and to unlock said virtual interface context, if a lock token of an unlock request received from the pipeline matches said held current lock token.

According to a second aspect of the invention, a system is provided, said system having a plurality of virtual interface schedulers for scheduling virtual interfaces, one virtual interface context cache shared by the virtual interface schedulers, one pipeline with a number of processing units, said pipeline shared by the virtual interface schedulers, wherein a respective virtual interface is always mapped to the same virtual interface scheduler, wherein the respective virtual interface scheduler is configured to send a lock request for a respective virtual interface to the virtual interface context cache, said virtual interface context cache configured to lock a virtual interface context of said respective virtual interface and to send a lock token to said virtual interface scheduler in dependence on said lock request, and said virtual interface context cache configured to hold a current lock token for the respective virtual interface context and to unlock said virtual interface context, if a lock token of an unlock request received from the pipeline matches said held current lock token.

According to a third aspect of the invention, a method for scheduling virtual interfaces is provided, said method comprising: sending a lock request for a respective virtual interface from a virtual interface scheduler to a virtual interface context cache, locking a virtual interface context of said respective virtual interface by said virtual interface context cache and sending a lock token to said virtual interface scheduler in dependence on said lock request, holding a current lock token for the respective virtual interface context by said virtual interface context cache, and unlocking said virtual interface context by said virtual interface context cache, if a lock token of an unlock request received from the pipeline matches said held current lock token.

BRIEF DESCRIPTION OF THE SEVERAL VIEWS OF THE DRAWINGS

Like or functionally-like elements in the figures have been allocated the same reference signs if not otherwise indicated.

DETAILED DESCRIPTION

Figure 1:
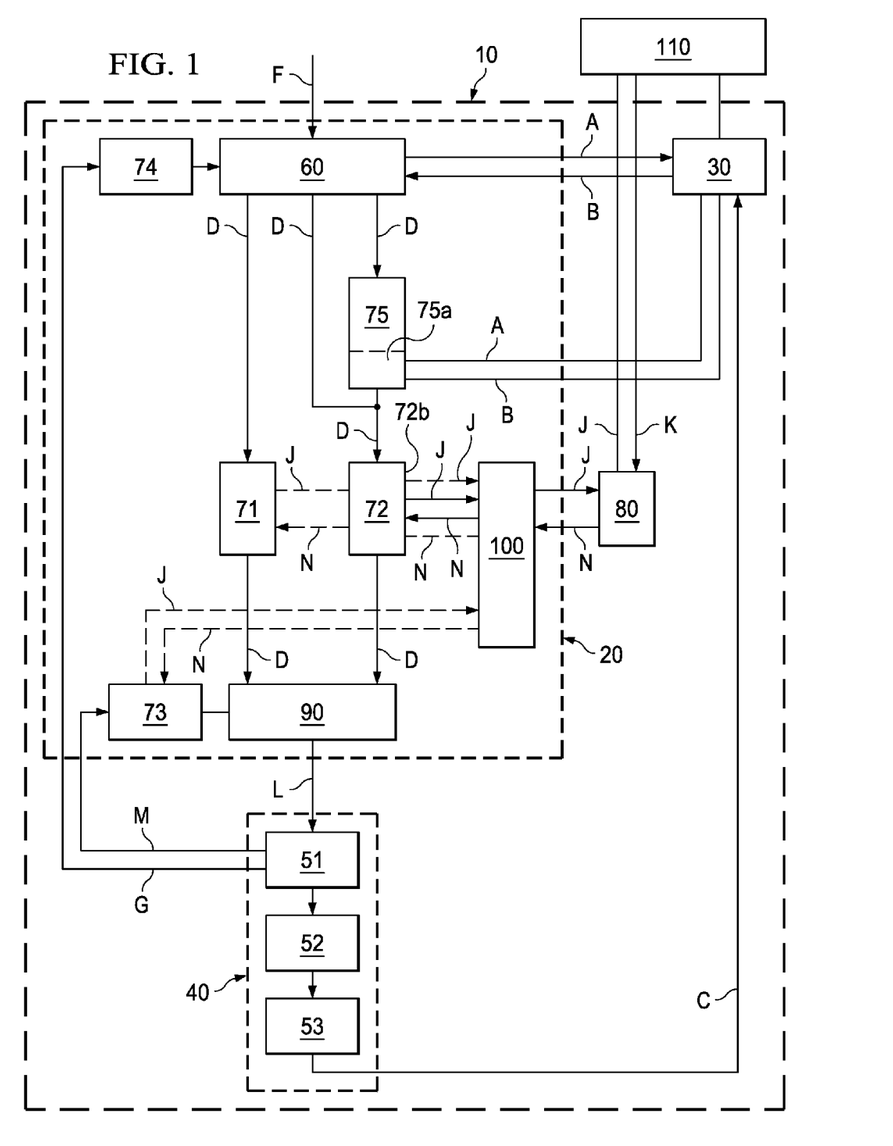
FIG. 1 shows an embodiment of a device using virtual interface scheduling.

FIG. 1 shows an embodiment of the device 10 for scheduling virtual interfaces.

The device 10 of FIG. 1 has a virtual interface scheduler 20, a virtual interface context cache 30, a pipeline 40 and a work request cache 80. Further, the device 10 is coupled with a memory 110. Memory 110 may be shared by the context cache 30 and the work request cache 90. In addition, they may use different memories, e.g. system memory for work requests and private device memory for context data.

The virtual interface scheduler 20 is configured to send a lock request A for the respective virtual interface to the virtual interface context cache 30.

In dependence on the received lock request A, the virtual interface cache 30 may lock a respective virtual interface context of the respective virtual interface and may send a lock token B to the virtual interface scheduler 20.

Further, the virtual interface context cache 30 may hold an actual or a current lock token for the respective virtual interface context. Furthermore, the virtual interface context cache 30 may unlock the virtual interface context, if a lock token of an unlock request C received from the pipeline 40 matches the held current lock token. The held current lock token may be stored in the virtual interface context cache 30.

Moreover, the virtual interface scheduler 20 may include the received lock token A within a scheduling element D. The scheduling element D may further include at least a virtual interface number E of the locked virtual interface context. The scheduling element D is described in further detail with reference to FIG. 2.

Furthermore, the virtual interface scheduler 20 may have a virtual interface synchronization unit 60 for synchronizing a received doorbell request F for the respective virtual interface with a current state of the device 10. The virtual interface synchronization unit 60 may further be adapted to attach a scheduling element D to a scheduling queue 71, 72, 75, if the respective virtual interface is not already scheduled.

Regarding the scheduling element D for the respective virtual interfaces, the virtual interface scheduler 20 may hold at most one scheduling element D for the respective virtual interface on the scheduling queues 71-75.

Regarding the scheduling queues 71-75, the scheduler 20 may have at least one physical queue 71-74 and at least one linked queue 75.

The respective physical queue 71-74 may have a number of queue slots. A queue slot may be configured to buffer one scheduling element D.

Moreover, the linked queue 75 may be created by means of the virtual interface contexts for linking the virtual interfaces on the linked queue 75. A head 75a of the linked queue 75 may be coupled to a tail 72b of one physical queue 72.

The scheduling queues 71-73 may be coupled to a virtual interface arbiter 90. The virtual interface arbiter 90 may be configured to arbitrate the scheduling elements D and to provide the arbitrated scheduling elements D to the pipeline 40.

For sending a lock request A to the virtual interface context cache 30, the scheduler 20 may have several possibilities.

In a first possibility, the virtual interface scheduler 20 may request a lock token B for the respective virtual interface from the virtual interface context cache 30, before it attaches a scheduling element D to a physical queue 71, 72 upon the reception of the doorbell request F.

In a second possibility, the virtual interface scheduler 20 may request a lock token B for the respective virtual interface from the virtual interface context cache 30 dependent on a resynchronization request G. The resynchronization request G may be generated and sent from the first processing unit 51 of the pipeline 40. The virtual interface scheduler 20 may do so, before it attaches a scheduling element D to a scheduling queue 71, 72, 75, only if the virtual interface scheduler 20 triggered an unlock request C for the respective virtual interface to the virtual interface context cache 30 in a previous scheduling cycle.

In a third possibility, a sending of a lock request A for a respective virtual interface to the virtual interface context cache 30 may be triggered by a transition of a scheduling element D from the linked queue 75 to the physical queue, e.g. 72. Further, such a transition may include adding the received lock token B to the scheduling element D on the physical queue 72.

As mentioned, several operation modes may be possible to request such a lock token B. In a first operation mode, the virtual interface scheduler 20 may request a lock token B for a respective virtual interface from the virtual interface context cache 30, before it attaches the scheduling element D to the linked queue 75. In a second operation mode, the virtual interface scheduler 20 may request a lock token B before it moves the scheduling element D from a linked queue 75 to a physical queue 72. Moreover, the virtual interface scheduler 20 may select the operation mode for locking virtual interface contexts of virtual interfaces dependent on the number of scheduled virtual interfaces.

In addition, the virtual interface synchronization unit 60 may attach a scheduling element D for the respective virtual interface to one of the physical queues 71, 72 or a linked queue 75 based on the received doorbell request F and available queue space, in case that the respective virtual interface is not already held in one of the scheduling queues 71-75. For the case, that the respective virtual interface is already held in one scheduling queue 71-75, no new scheduling may be done.

Furthermore, the number of scheduling queues 71-75 may include a physical resynchronization queue 74 for resynchronizing virtual interfaces and a physical rescheduling queue 73 for rescheduling virtual interfaces. The resynchronization queue 74 may be coupled between the first processing unit 51 of the pipeline 40 and the virtual interface synchronization unit 60. Further, the rescheduling queue 73 may be coupled between said first processing unit 51 and the virtual interface arbiter 90. Priorities between the physical queues 71, 72 are fixed, if the rescheduling queue 73 is empty. Further, priorities between the physical queues 71-73 may be adapted in dependence on a priority originally given to a scheduling element D by the virtual interface synchronization unit 60 of a head of the rescheduling physical queue 73 and/or at least on information provided by the first processing unit 51.

As already mentioned above, the device 10 has a work request cache 80 adapted to cache work requests. The virtual interface scheduler 20 may select a virtual interface for processing, which has its virtual interface context locked and at least one work request available in the work request cache 80.

Each time the virtual interface context cache 30 receives a lock request A for a respective virtual interface, it may increment the lock token B for the respective virtual interface context. In the following, the virtual interface context cache 30 may send the incremented lock token B to the virtual interface scheduler 20. Also, the virtual interface context cache 30 may replace the held current lock token by the incremented lock token B.

Figure 2:
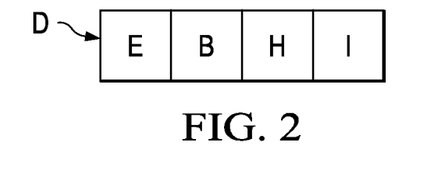
FIG. 2 shows an embodiment of a scheduling element.

Coming to the details of the scheduling element D, with reference to FIG. 2, a scheduling element D may include a virtual interface number E of the respective locked virtual interface context, a lock token B, a work request count H and a work request availability indication I. The virtual interface number E indicates the number of the respective virtual interface. The lock token B indicates the lock status of the respective virtual interface. The work request count H may indicate the number of work requests to be processed by the respective virtual interface. Further, the work request availability indication I may indicate an availability of the work request for the virtual interface.

Regarding the functions of the pipeline 40, the first processing unit 51 of the pipeline 40 may be configured to trigger an unlock request C by the last processing unit 53 of the pipeline 40 to the virtual interface context cache 30. This trigger may be dependent on a work request count H of a respective scheduling element D (see FIG. 2) and the number of completed work requests for the same virtual interface within a processing cycle.

Furthermore, the virtual interface scheduler 20 may have a work request arbiter 100. The work request arbiter 100 may be coupled between the physical queues 71-73 and the work request cache or work request buffer 80.

The work request arbiter 100 may be configured to send a work request fetch request J to the work request cache 80.

Further, the work request cache 80 may be configured to signal work request availability to the work request arbiter 100. In particular, the work request cache 80 may send a work request availability signal N to the work request arbiter 100, if the respective work request is cached in the work request cache 80.

In addition, the work request cache 80 may fetch the respective work request K from memory 110 and to signal work request availability to the work request arbiter 100 after receiving said work request K from the memory 110. In this regard, the work request arbiter 100 may create the work request fetch request J dependent on the scheduling elements D provided by the physical queues 71-73. In addition, the work request cache 80 may be configured to trigger a fetch of a plurality of work requests K for the respective virtual interface from the memory 110 (pre-fetching), if the respective virtual interface has more than one work request K waiting for processing and there is enough space in the work request cache 80.

Moreover, the virtual interface arbiter 100 may arbitrate only such a scheduling element D that has a positive work request availability indication I. Here, the work request arbiter 100 may set the work request availability indication I of one scheduling element D dependent on the work request availability signal N received from the work request cache 80.

Within the scheduler 20, the virtual interface arbiter 90 may generate a virtual interface processing request L dependent on an arbitrated scheduling element D. In this regard, the virtual interface arbiter 90 may be configured to provide a virtual interface processing request L with additional information created during scheduling. An example for such an additional information may be the lock token B of the scheduling element D.

As already indicated above, the last processing unit 53 may send the unlock request C containing the lock token B of the received virtual interface processing request L to the virtual interface context cache 30 based on an unlock request information provided by the first pipeline stage 51.

Figure 3:
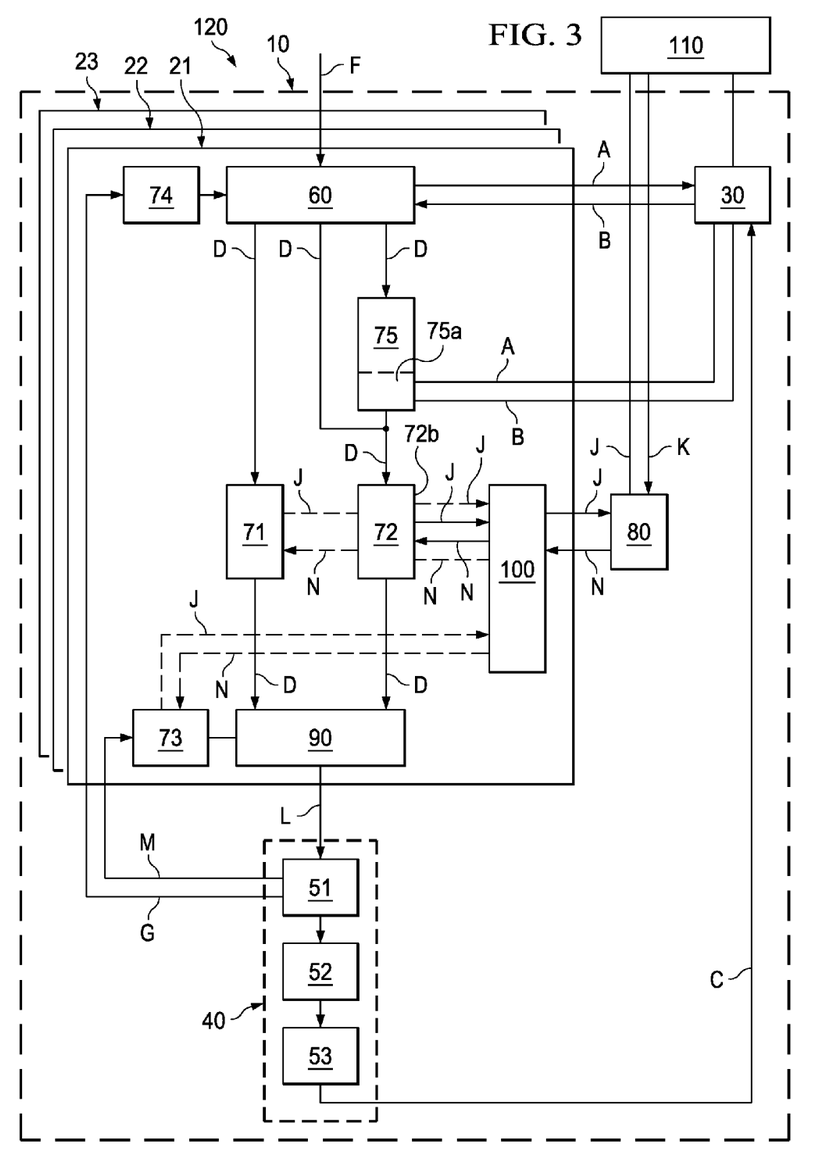
FIG. 3 shows an embodiment of a system having a plurality of virtual interface schedulers.

FIG. 3 shows an embodiment of a system 120 having a plurality of virtual interface schedulers 21-23 for scheduling virtual interfaces. Without loss of generality, the system 120 of FIG. 3 has three virtual interface schedulers 21-23 for scheduling virtual interfaces. In particular, there are multiple schedulers within the same device. For an InfiniBand device, e.g., one virtual interface scheduler may be implemented per service level (SL).

Further, the system 120 has one virtual interface context cache 30 shared by the virtual interface schedulers 21-23. Furthermore, the system 120 has one pipeline 40 with a number of processing units 51-53. The pipeline 40 may be shared by the number of virtual interface schedulers 21-23, wherein a respective virtual interface is always mapped to the same virtual interface scheduler 21-23.

The functionality of the respective virtual interface scheduler 21-23 is described with reference to the virtual interface scheduler 20 of FIGS. 1 and 2.

With respect to the following FIGS. 4-7b, the reference sign DB indicates a doorbell request, SL sched a service level scheduler or virtual interface scheduler, WR Pkt a work request packet unit or first unit of a pipeline, HDR Buf a header buffer unit or last unit of a pipeline, QPC a queue pair context, hldoff a hold off indicating a request in the doorbell context, req a request, lock (1) a lock request having the token 1, unl. ind an unlock indication, VI a virtual interface, WR a work request, DB a doorbell, LL_Q a low latency queue, Sched_Qs scheduling queues, Phys_Q a physical queue, VIC a virtual interface context, LQ a lock queue, SQ a single queue, PQ a physical queue, and WRC a work request count.

As mentioned above, a queue pair (QP) is a prominent example of a virtual interface. Besides the scheduling of work requests, also the queue pair context management is very important for performing a scalable scheduling. One aspect of the queue pair context management is the cache management. During lock mode, the preferred context castout order is least recently used (LRU). In unlock mode, on the other hand, the best castout order may be most recently used (MRU) for contexts that have requests pending as MRU is able to conserve a number of cache hits during high-load situations, while traditional LRU potentially destroys all cache locality.

In addition, context castout candidates are frequently chosen randomly, because maintaining castout lists is very expensive. A genuine castout list needs to be fully linked, requiring two context accesses for adding and three context accesses for removing a queue pair. A random selection of queue pair castouts can also select queue pairs that are currently processed. To avoid stalls due to context misses, queue pair contexts are locked by the scheduler and unlocked by the header buffer when processing is finished. Further, the doorbell unit does not lock queue pair contexts explicitly. To ensure that a queue pair context is not cast out while the doorbell request is processed, it indicates queue pairs that are currently processed in doorbell slots to the queue pair context unit, namely the virtual interface context cache, holding off castout attempts. For such a procedure, a dedicated hold-off interface may be used (not shown).

Such a hold-off may only be active as long as a queue pair is processed in a doorbell slot. The hold-off may also be used by the queue pair synchronization unit, namely the virtual interface synchronization unit, in an unlocking mode. There, the last element of the linked queue shall not be cast out as it is needed to link the next queue element. The virtual interface synchronization unit therefore signals the last queue pair on the linked queue to the queue pair context unit, namely the virtual interface context cache, so that this queue pair context, namely the virtual interface context, will not be chosen for castout.

In addition, instead of hold-offs, used during doorbell processing, explicit queue pair lock and unlock requests may be used to avoid castouts of queue pairs while they are processed. The queue pair context or virtual interface context is locked at the beginning and unlocked when processing is finished. The major challenge for the queue pair handling is the decision whether to unlock a queue pair context.

The problem here may be the variable packet processing time combined with possible new doorbell requests, resulting in potential race conditions. As long as there is work pending for a queue pair or a virtual interface, it can always be kept locked by the scheduler. After the last packet of a queue pair is scheduled, the queue pair context shall stay locked until the header has been processed and is stored in the header buffer. The header buffer then unlocks the queue pair context. However, in the meantime, a new doorbell request may have arrived for the same queue pair. The queue pair synchronization unit then sees the queue pair context locked while the previous packet is processed and does not lock the context. The queue pair may then be cast out after being unlocked from the previous packet sent, while the new request is still being processed. Even locking the queue pair anew from the queue pair synchronization unit cannot prevent the unlock through the request from the header buffer.

This problem may be circumvented by always checking the queue pair scheduling state before unlocking a context. However, this has the disadvantage that it increases contention for the context used by the queue pair synchronization unit. Therefore, the present invention provides a light-weight scheme using lock tokens. Thus, a queue pair locking operation is not single-sided, but receives a lock token in the lock request response. All lock requests increase the token count in the queue pair context unit or virtual interface context cache, and a queue pair (virtual interface) is only unlocked if the token used in the unlock request matches the token in the queue pair context unit. The token does not need to be stored in the queue pair context when the queue pair context is castout of the device cache, as it can only be castout when the queue pair context is currently unlocked, i.e. all lock and unlock requests have been processed as every lock request creates exactly one unlock request.

Figure 4:
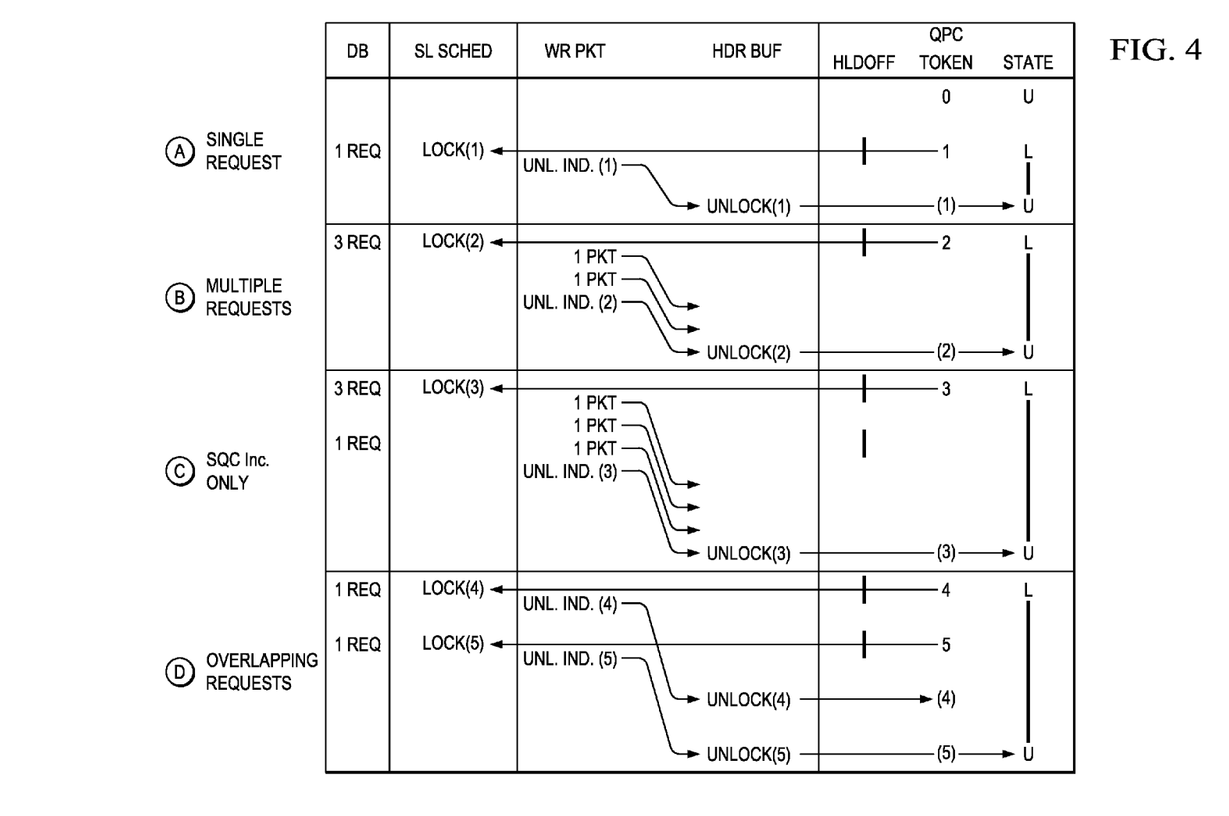
FIG. 4 shows an example of operations for virtual interface context locking in accordance with an illustrative embodiment.

FIG. 4 shows an example of operations for virtual interface context locking having four sub-examples A-D in accordance with an illustrative embodiment.

For a single request as indicated in A, the doorbell request arrives and the queue pair context castout hold-off is set during the doorbell and the queue pair synchronization processing phase. The queue pair synchronization unit locks the context and receives the new lock token from the queue pair context unit. The work request packet (WR pkt) unit sets the unlock indication to following processing units and includes the token, as part of the unlock request, which is used by the header buffer to unlock the queue pair context.

From the work request packet unit to the header buffer, queue pair requests need to be kept in strict order, e.g. due to the Infiniband in-order packet delivery requirement. For multiple requests as indicated in B, only the last packet request indicates to the header buffer that the queue pair context shall be unlocked as the request created last by the work request packet unit is also the last one to arrive in the header buffer.

Referring to C, to reduce the number of necessary lock and unlock requests in the lock mode, the header buffer only unlocks requests when the packet is the last currently pending for a queue pair. The unlock indication is created by the WR pkt unit while creating a work request packet request, which then also contains the latest lock token. Thus, no new lock has to be obtained for the second doorbell request, as the last work request packet request of the previous doorbell was not yet created.

Referring to D, showing a case with overlapping requests, a race condition as described above is created. The queue pair synchronization unit issues a new lock request for the second doorbell and receives a new lock token (5), which is necessary as the first request would otherwise unlock the queue pair context while the second request is still being processed. When the header buffer tries to unlock the queue pair context with the token provided by the first packet request, the unlock request is ignored by the queue pair context unit as it does not use the right unlock token. Thus, the context stays locked until the unlock request having the matching token arrives.

Further, FIG. 4 also shows the use of the castout hold-off. The castout hold-off protects contexts from being castout during the entire doorbell process, from receiving the doorbell request until obtaining the new lock.

Figure 5:
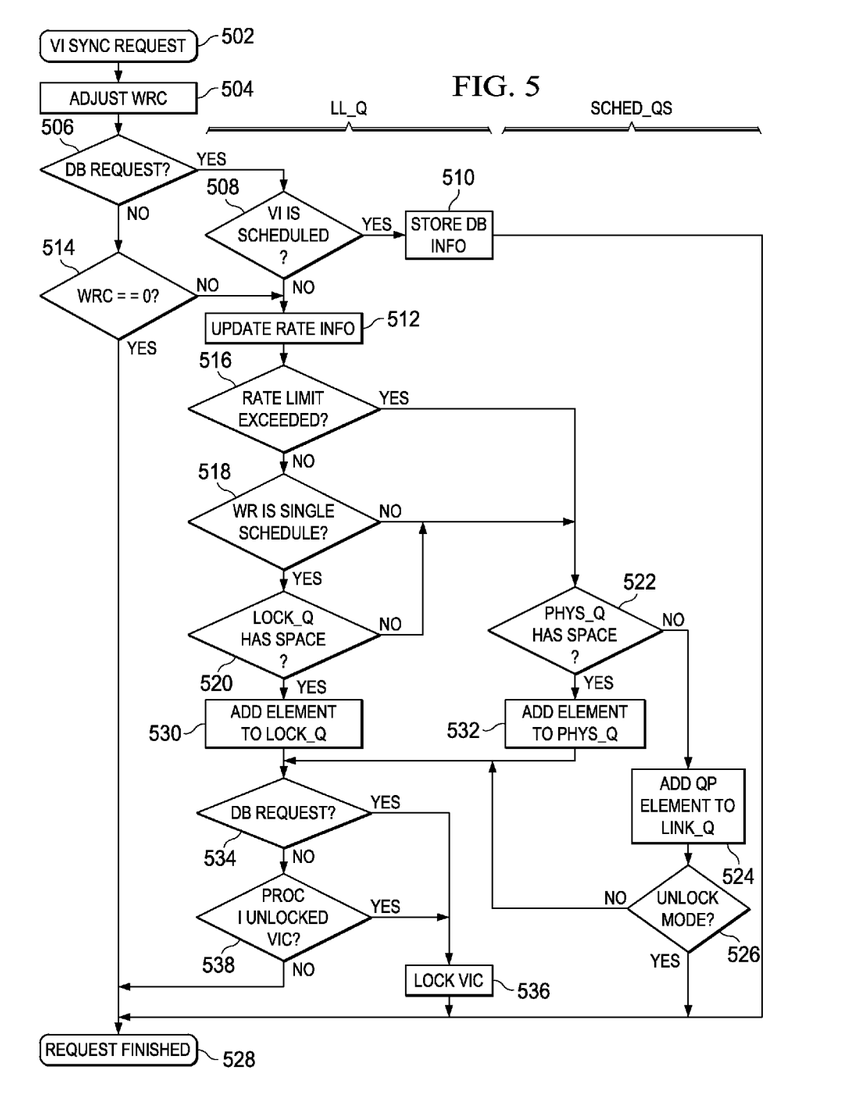
FIG. 5 shows an example of a synchronization flow of virtual interfaces in accordance with an illustrative embodiment.

In this regard, FIG. 5 shows an example of a synchronization flow of virtual interfaces in accordance with an illustrative embodiment. During a VI synchronization request (block 502), a first step is to adjust the work request count WRC (block 504). In the case of a doorbell request (block 506), it is checked if the VI is already scheduled (block 508). If the VI is already scheduled, only the doorbell information is updated (block 510). Otherwise, a rate information is updated (block 512). Further, the virtual interface is attached to a scheduling queue. In case of a resynchronization request, it is checked if the work request count WRC reaches zero (block 514). In such a case, the virtual interface VI is not rescheduled. If there is work remaining, the rate information is updated (block 512) and the virtual interface is reattached to a queue.

In the case that the virtual interface VI is attached to a queue, it is first checked if the rate limit is exceeded (block 516). If not, and the next request is a single scheduling element in block 518, the lock queue is tried (block 520). If this is not the case or the lock queue is full in block 520, the physical queue is tried (block 522). If the physical queue is full as well, the virtual interface is attached to the linked queue (block 524). If the virtual interface is attached to a linked queue and the scheduler is in the unlock mode (block 526), the virtual interface synchronization request is finished (block 528).

Otherwise, if the resynchronization is a doorbell request (block 534) and it is attached to a queue (blocks 530 and 532), the virtual interface is not present on a queue. Therefore, the scheduler locks the virtual interface context (block 536). Otherwise, the request is a resynchronization request. If the first processing unit, the WR pkt unit, signals that it requested unlock to the last processing unit (block 538), the virtual interface needs to be locked in block 536. Otherwise, it is still locked and no new token needs to be obtained.

Figure 6:
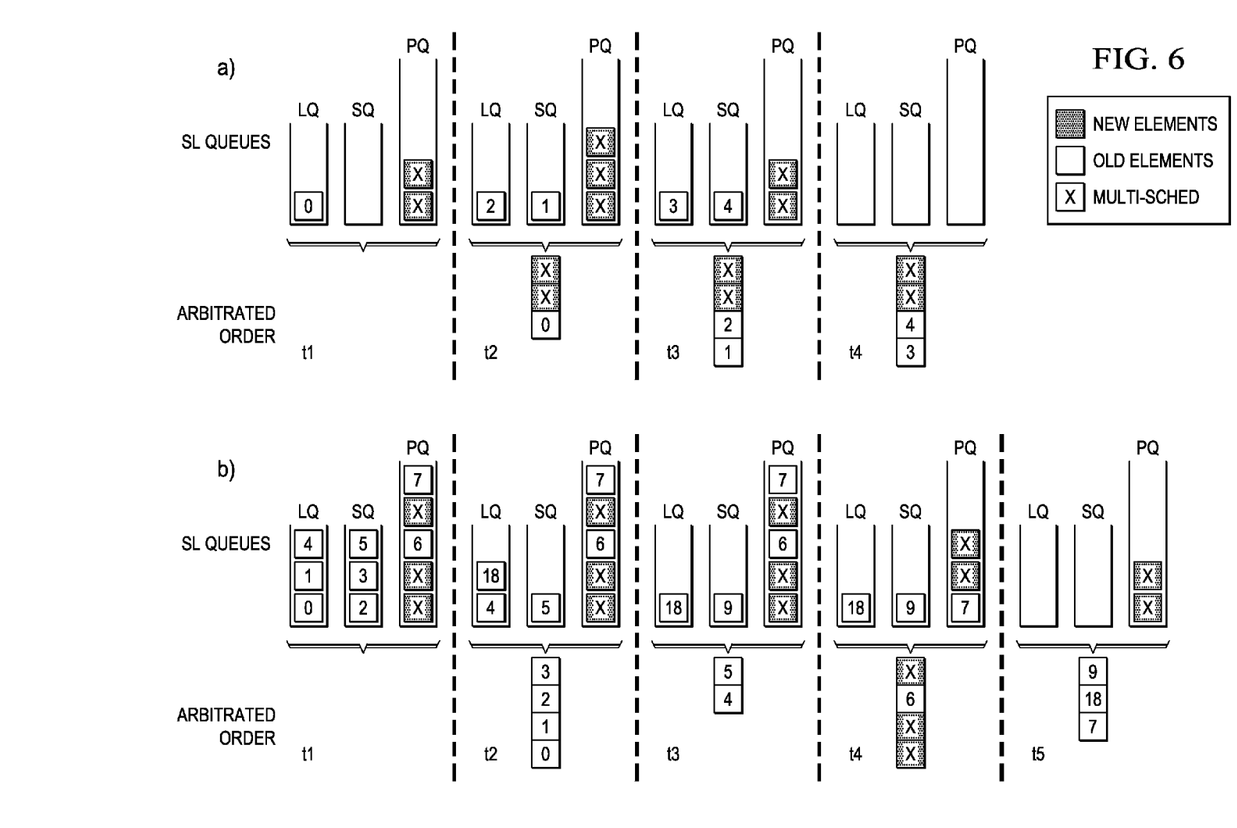
FIG. 6 shows an example for an arbitration of virtual interfaces in accordance with an illustrative embodiment.

FIG. 6 shows an example for an arbitration of virtual interfaces in accordance with an illustrative embodiment. Thus, FIG. 6 shows the function of the virtual interface arbiter of FIGS. 1 and 3. The transition from the linked queue to the physical queue requires a look-up of the link in the virtual interface context. When a slot becomes free on the physical queue, the scheduler checks if there are elements on the linked queue. If the scheduler is in the unlock mode, a fetch and lock request for the first linked virtual interface context is issued to the virtual interface context cache. When the virtual interface context lock is granted by the virtual interface context cache, the scheduling element is created by the scheduler. In lock mode, just the new scheduling element is set up. Transitions from the linked queue to the physical queue, and therefore additional virtual interface context look-ups during scheduling are only necessary when more virtual interfaces are pending than slots are available on the physical queues.

All elements on the lock queue, the single queue and the physical queue thus have their contexts locked, either directly by the virtual interface synchronization unit or by the transition from the linked queue to the physical queue. In order to be considered for the arbitration of virtual interfaces, the elements further need to have the next work request locked in the work request cache. Scheduling elements on the lock queue are ready to be presented in the virtual interface arbiter immediately after they are added to the queue, as the work request has been locked during the doorbell store. Before the scheduling elements on the other queues are considered by the virtual interface arbiter, their work requests need to be fetched into the work request buffer and locked so that they are not cast out before having been processed by the work request packkt unit WR pkt, as an example of the first processing unit of the pipeline. The single and physical queue issue fetch and lock requests to the work request cache for all elements that are not locked yet.

Aside from just buffering work requests, the work request cache may also keep track of the current work request packet processed. Therefore, it may signal back in the response to a work request fetch the number of work request packet requests needed for the work request. This information may then be used for selecting large background transfers for filling the link bandwidth.

Generally, the lock and single queues are given priority in the virtual interface arbiter. They are tagged with timestamps to allow fair scheduling between the two queues. To allow fair scheduling also in the case that the physical queues are overflowing, scheduling for the low-latency queues can be either completely disabled or just delayed until an element that was misplaced on the linked queue or the physical queue has been processed.

In this regard, FIG. 6 shows two examples for an arbitration of virtual interfaces. In detail, FIG. 6a shows a normal queue arbitration. Further, FIG. 6b shows an arbitration for the case of overflowing low-latency queues using delayed LL (low latency) queue processing.

In detail, FIG. 6a shows the queue state and arbitrated processing order at different times t1 to t4. The infrequently arriving low-latency requests are always given priority by the virtual interface arbiter 90. At t2, the LL request 0 has been arbitrated ahead of the two regular requests (x). At t3 and t4, low-latency requests 1, 2, 3 and 4 have also been given priority over the regular or normal requests (x).

In FIG. 6b, the lock and single queue LQ, SQ are full and new low-latency requests 6 and 7 had to be added to the physical queue PQ. The requests 1 to 5 are still processed with priority while the new LL request 8 attached to the lock queue LQ is marked (with a !), indicating that it has to have priority for elements from the physical queue PQ. Thus, regular elements (x) as well as requests 6 and 7 are arbitrated ahead of request 8, while request 8 also blocks request 9 on the single queue SQ from being processed.

This mechanism shall only be used temporarily, as delaying processing of locked work requests increases the ratio of locked to unlocked work requests in the work request cache 80, which may complicate work request pre-fetching from the scheduler 20. To avoid this, the device 10 may disable the locking of work request doorbells and also the use of single schedule queues SQ when the locking ratio increases in the work request cache 80.

On the way to the first processing unit 51 of the pipeline 40, e.g. the work request packet unit, the VI arbiter 90 takes into account both service level arbitration and virtual lane (VL) credit information. VL credit information may be used to avoid that requests that cannot be sent on the network link at the moment due to missing virtual lane credits consume processing resources.

The first processing unit 51 of the pipeline 40, e.g. the work request packet unit, creates work request packet requests for queue pair work requests and forwards them to a second processing unit 52, e.g. the address translation unit. The number of work requests and work request packets that are at most processed during one cycle may be defined for each virtual interface separately.

Figure 7A:
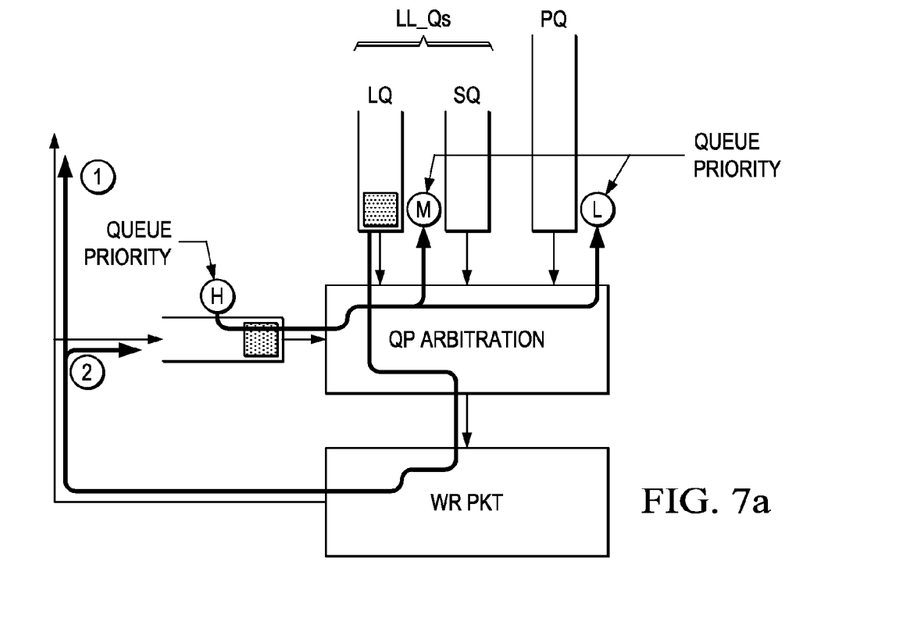
FIG. 7a, 7b show an example of a rescheduling flow for virtual interfaces in accordance with an illustrative embodiment.
Figure 7B:
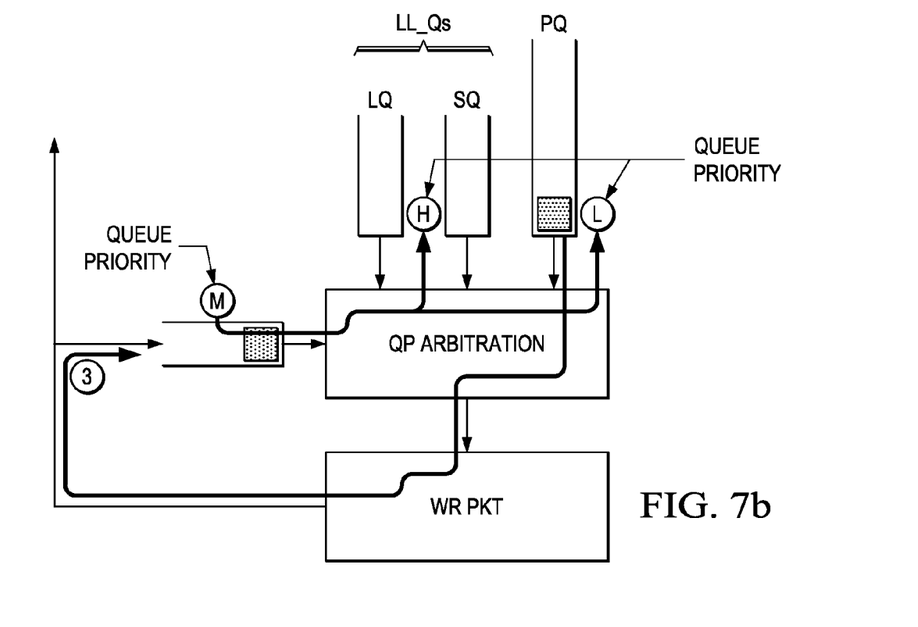

Further, FIGS. 7a and 7b show an example of a rescheduling flow for virtual interfaces, e.g. queue pairs. When the first processing unit 51, e.g. the work request packet unit WR pkt, has created all work parts for a respective virtual interface, the work request packet unit 51 may make a request back to the virtual interface synchronization unit 60 for resynchronization (see path (1) in FIG. 7a). During the last work request buffer request during the scheduling cycle, the according work request is unlocked. Work requests that have been completed are immediately discarded from the work request cache or buffer 80.

If a queue pair could not continue processing because the work request data is not available in the work request cache 80, the queue pair is not resynchronized using the virtual interface synchronization unit 60, but is attached to the rescheduling queue 73 (see path (2) in FIG. 7a). The rescheduling queue 73 initiates the necessary work request fetch and the queue pair is scheduled again for processing with highest priority after the work request is available in the work request buffer 80. Thus, the rescheduling queue 73 has the highest priority in FIG. 7a.

With respect to FIG. 7b, as long as there are no low-latency requests misplaced on the physical queue 72 or the linked queue 75, the rescheduling queue 73 may also be used to process large requests from the scheduling queues to completion. The work request packet unit 51 may therefore attach a queue pair with a work request with outstanding transfers to the rescheduling queue 73 until the work request is finished (see path (3) in FIG. 7b). For the queue pair arbitration, the rescheduled element may indicate a change in the queue priority, such that low-latency queues have highest priority now. This may allow low-latency requests to be processed in between the packets of the large transfer, while the transfer from the rescheduling queue 73 is preferred over new requests from the physical queue 72. Therefore, it allows accommodating efficient scheduling for bandwidth limited large transfers.

Figure 8:
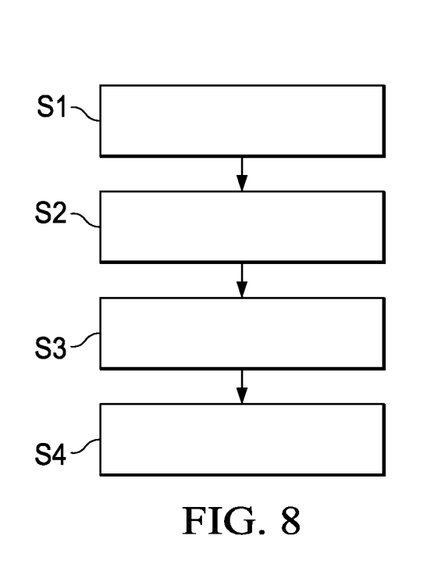
FIG. 8 shows an embodiment of a sequence of method steps for scheduling virtual interfaces in accordance with an illustrative embodiment.

FIG. 8 shows an embodiment of a sequence of method steps for scheduling virtual interfaces in accordance with an illustrative embodiment.

The embodiment of the method according to the invention as shown in FIG. 8 has the following method steps S1-S4 and is described with reference to FIG. 1:

In block S1, a lock request A for a respective virtual interface is sent from a virtual interface scheduler 20 to a virtual interface context cache 30.

In block S2, a virtual interface context of said virtual interface is locked by said virtual interface context cache 30.

Further, a lock token B is sent back to said virtual interface scheduler 20 in dependence on said lock request A.

In block S3, a current lock token for the respective virtual interface context is held by said virtual interface context cache 30.

In block S4, a virtual interface context is unlocked by said virtual interface context cache 30, if a lock token of an unlock request C received from the pipeline 40 having a number of processing units 51-53 matches said held current lock token.

What has been described herein is merely illustrative of the application of the principles of the present invention. Other arrangements and systems may be implemented by those skilled in the art without departing from the scope and spirit of this invention.

The invention claimed is:

1. A device for scheduling virtual interfaces, the device comprising:
   a virtual interface scheduler, wherein the virtual interface scheduler is a hardware component of the device;
   a virtual interface context cache; and
   a pipeline having one or more processing units, wherein each of the one or processing units is a hardware component;
   wherein the virtual interface scheduler is configured to send a lock request for a respective virtual interface to the virtual interface context cache;
   wherein the virtual interface context cache is configured to lock a virtual interface context of the respective virtual interface and to send a lock token to the virtual interface scheduler;
   wherein the virtual interface context cache is configured to hold a current lock token for the respective virtual interface context and to unlock the virtual interface context responsive to a determination that a lock token of an unlock request received from the pipeline matches the held current lock token; and
   wherein the virtual interface scheduler is configured to request a lock token for a respective virtual interface from the virtual interface context cache dependent on a resynchronization request received from a processing unit of the pipeline, before the virtual interface scheduler attaches a scheduling element to a scheduling queue responsive to the virtual interface scheduler triggering an unlock request for the respective virtual interface to the virtual interface context cache in a previous scheduling cycle.

2. The device of claim 1, wherein the virtual interface scheduler has one or more scheduling queues,
   wherein the virtual interface scheduler is configured to hold at most one scheduling element for the respective virtual interface on the scheduling queues,
   wherein the one or more scheduling queues comprise at least one physical queue and at least one linked queue, and
   wherein each physical queue comprises one or more queue slots, wherein each queue slot is configured to buffer one scheduling element.

3. The device of claim 2, wherein the virtual interface scheduler is configured to request a lock token for a respective virtual interface from the virtual interface context cache before the virtual interface scheduler attaches a scheduling element created dependent on a received doorbell request to a physical queue responsive to receiving the doorbell request.

4. The device of claim 1, further comprising a work request cache configured to cache work requests, wherein the virtual interface scheduler is configured to select a virtual interface for processing, wherein the selected virtual interface has its virtual interface context locked and at least one work request available in the work request cache.

5. The device of claim 1, wherein the virtual interface context cache is configured to increment the lock token for the respective virtual interface context each time a lock request is received for the respective virtual interface, to send the incremented lock token to the virtual interface scheduler, and to replace the held current lock token by the incremented lock token.

6. The device of claim 1, wherein a first processing unit of the pipeline is configured to trigger an unlock request by a last processing unit of the pipeline to the virtual interface context cache dependent on a work request count of a respective scheduling element and a number of completed work requests for the same virtual interface within a processing cycle.

7. The device of claim 1, wherein the virtual interface scheduler comprises a work request arbiter coupled between at least one physical queue and a work request cache,
   wherein the work request arbiter is configured so send a work request fetch request to the work request cache,
   wherein the work request cache is configured to signal work request availability to the work request arbiter responsive to a determination that the respective work request is cached in the work request cache or to fetch the respective work request from memory and to signal work request availability to the work request arbiter after receiving the work request from the memory.

8. The device of claim 7, wherein the work request cache is configured to trigger a fetch of a plurality of work requests for the respective virtual interface from the memory responsive to a determination that the respective virtual interface has more than one work request waiting for processing and there is enough space in the work request cache.

9. The device of claim 2, wherein the one or more scheduling queues comprise a physical resynchronization queue for resynchronizing virtual interfaces and a physical rescheduling queue for rescheduling virtual interfaces,
   wherein the resynchronization queue is coupled between a first processing unit of the pipeline and a virtual interface arbiter, and
   wherein the rescheduling queue is coupled between the first processing unit and a virtual interface synchronization unit.

10. The device of claim 9, wherein priorities between the physical queues are adapted in dependence on a priority originally given to a scheduling element by the virtual interface synchronization unit of a head of the physical rescheduling queue or on information provided by the first processing unit.

11. A system, comprising:
    a plurality of virtual interface schedulers for scheduling virtual interfaces, wherein each of the plurality of virtual interface schedulers is a hardware component of the system;
    a virtual interface context cache shared by the virtual interface schedulers; and
    a pipeline comprising one or more processing units, wherein the pipeline is shared by the plurality of virtual interface schedulers and wherein each of the one or more processing units is a hardware component,
    wherein a respective virtual interface is always mapped to a respective virtual interface scheduler,
    wherein the respective virtual interface scheduler is configured to send a lock request for a respective virtual interface to the virtual interface context cache, wherein the virtual interface context cache is configured to lock a virtual interface context of the respective virtual interface and to send a lock token to the virtual interface scheduler, wherein the virtual interface context cache is configured to hold a current lock token thr the respective virtual interface context and to unlock the virtual interface context responsive to a determination that a lock token of an unlock request received from the pipeline matches the held current lock token; and wherein a given virtual interface scheduler within the plurality of virtual interface schedulers is configured to request a lock token for a respective virtual interface from the virtual interface context cache dependent on a resynchronization request received from a processing unit of the pipeline, before the given virtual interface scheduler attaches a scheduling element a scheduling queue responsive to the given virtual interface scheduler triggering an unlock request for the respective virtual interface to the virtual interface context cache in a previous scheduling cycle.

12. The system of claim 11, wherein a given virtual interface scheduler has one or more scheduling queues, wherein the given virtual interface scheduler is configured to hold at most one scheduling element for the respective virtual interface on the scheduling queues, wherein the one or more scheduling queues comprise at least one physical queue and at least one linked queue, and wherein each physical queue comprises one or more queue slots, wherein each queue slot is configured to buffer one scheduling element.

13. The system of claim 11, further comprising a work request cache configured to cache work requests, wherein a given virtual interface scheduler is configured to select a virtual interface for processing, wherein the selected virtual interface has its virtual interface context locked and at least one work request available in the work request cache.

14. The system of claim 11, wherein the virtual interface context cache is configured to increment the lock token for the respective virtual interface context each time a lock request is received for the respective virtual interface, to send the incremented lock token to a given virtual interface scheduler, and to replace the held current lock token by the incremented lock token.

15. The system of claim 11, wherein a first processing unit of the pipeline is configured to trigger an unlock request by a last processing unit of the pipeline to the virtual interface context cache dependent on a work request count of a respective scheduling element and a number of completed work requests for the same virtual interface within a processing cycle.

16. The system of claim 11, wherein a given virtual interface scheduler comprises a work request arbiter coupled between at least one physical queue and a work request cache, wherein the work request arbiter is configured so send a work request fetch request to the work request cache, wherein the work request cache is configured to signal work request availability to the work request arbiter responsive to a determination that the respective work request is cached in the work request cache or to fetch the respective work request from memory and to signal work request availability to the work request arbiter after receiving the work request from the memory.

17. The system of claim 16, wherein the work request cache is configured to trigger a fetch of a plurality of work requests for the respective virtual interface from the memory responsive to a determination that the respective virtual interface has more than one work request waiting for processing and there is enough space in the work request cache.

* * * * *